US012586246B2

(12) United States Patent
Banolia et al.

(10) Patent No.: US 12,586,246 B2
(45) Date of Patent: Mar. 24, 2026

(54) SYSTEM AND METHOD FOR VICARIOUS CALIBRATION OF OPTICAL DATA FROM SATELLITE SENSORS

(71) Applicant: Tata Consultancy Services Limited, Mumbai (IN)

(72) Inventors: Chaman Banolia, New Delhi (IN); Balamuralidhar Purushothaman, Bangalore (IN); Shailesh Shankar Deshpande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 442 days.

(21) Appl. No.: 18/233,352

(22) Filed: Aug. 14, 2023

(65) Prior Publication Data

US 2024/0095956 A1 Mar. 21, 2024

(30) Foreign Application Priority Data

Sep. 8, 2022 (IN) .............................. 202221051326

(51) Int. Cl.
| | |
|---|---|
| *G06T 7/80* | (2017.01) |
| *G06V 20/10* | (2022.01) |
| *G06V 20/13* | (2022.01) |

(52) U.S. Cl.
CPC .............. *G06T 7/80* (2017.01); *G06V 20/13* (2022.01); *G06V 20/176* (2022.01); *G06V 20/188* (2022.01); *G06T 2200/28* (2013.01); *G06T 2207/10032* (2013.01); *G06T 2207/20036* (2013.01); *G06T 2207/20076* (2013.01);

(Continued)

(58) Field of Classification Search
None
See application file for complete search history.

(56) References Cited

FOREIGN PATENT DOCUMENTS

| CN | 104133204 B | 6/2016 |
|---|---|---|
| CN | 106126826 B | 2/2019 |

OTHER PUBLICATIONS

Xia Zhang, Bing Zhang, Xiurui Geng, Qingxi Tong, and Lanfen Zheng "Automatic flat field algorithm for hyperspectral image calibration", Proc. SPIE 5286, Third International Symposium on Multispectral Image Processing and Pattern Recognition, (Sep. 25, 2003) (Year: 2003).*

(Continued)

*Primary Examiner* — SJ Park
*Assistant Examiner* — Caroline E. Depalma
(74) *Attorney, Agent, or Firm* — Finnegan, Henderson, Farabow, Garrett & Dunner, LLP

(57) ABSTRACT

Embodiments herein provide a method and system for a vicarious calibration of optical data from satellite sensors for urban scene flat fields. Identifying test sites automatically in the urban scene helps in vicarious calibration or on-board calibration of the hyperspectral/multispectral image. An internal average relative reflectance is calculated to get a relative reflectance of the image. Band ratios for various pixels is determined to assess flatness of the spectrum. Flat field candidates are identified from the various pixels having average band ratio nearing zero and a morphological technique is applied to determine a flat field. Finally, the image is calibrated vicariously based on the determined flat field as a test site. The on-board calibration of the remote sensing image may lead to a faster way to get the reflectance image of the scene, with the help of the calibration constants.

15 Claims, 3 Drawing Sheets

(52) U.S. Cl.
CPC ............... *G06T 2207/30184* (2013.01); *G06T 2207/30188* (2013.01)

(56) References Cited

OTHER PUBLICATIONS

Anna Brook, Eyal Ben Dor, Supervised vicarious calibration (SVC) of hyperspectral remote-sensing data, Remote Sensing of Environment, vol. 115, Issue 6, 2011, pp. 1543-1555, ISSN 0034-4257 (Year: 2011).*

S. Deshpande, A. Inamdar and H. Vin, "Assessment of optimal flat field in urban environment for EO1-hyperion scene," 2014 6th Workshop on Hyperspectral Image and Signal Processing: Evolution in Remote Sensing (WHISPERS), Lausanne, Switzerland, 2014, pp. 1-4 (Year: 2014).*

Alexander Kokka, Tomi Pulli, Eija Honkavaara, Lauri Markelin, Petri KärhÄ¤ and Erkki Ikonen. Flat-field calibration method for hyperspectral frame cameras. Metrologia 56 055001. 2019. DOI 10.1088/1681-7575/ab3261. (Year: 2019).*

Brook et al., "Supervised vicarious calibration (SVC) of hyperspectral remote-sensing data," Remote Sensing of Environment, 115:1543-1555 (2011).

Clark et al., "Surface Reflectance Calibration of Terrestrial Imaging Spectroscopy Data: a Tutorial Using AVIRIS," (2002).

Kokka et al., "Flat-field calibration method for hyperspectral frame cameras," Metrologia, 56 (2019).

Kumar et al., "Comparison of efficient techniques of hyper-spectral image preprocessing for mineralogy and vegetation studies," Indian Journal of Geo Marine Sciences, 46(05):1008-1021 (2017).

Merzah et al., "Assessment of Atmospheric Correction Methods for Hyperspectral Remote Sensing Imagery Using Geospatial Techniques," 745 (2020).

Pesta et al., "Radiometric Non-Uniformity Characterization and Correction of Ladsat 8 OLI Using Earth Imagery-Based Techniques," Remote Sens., 7:430-446 (2015).

Suomalainen et al., "Direct reflectance transformation methodology for drone-based hyperspectral imaging," Remote Sensing of Environment, 266 (2011).

\* cited by examiner

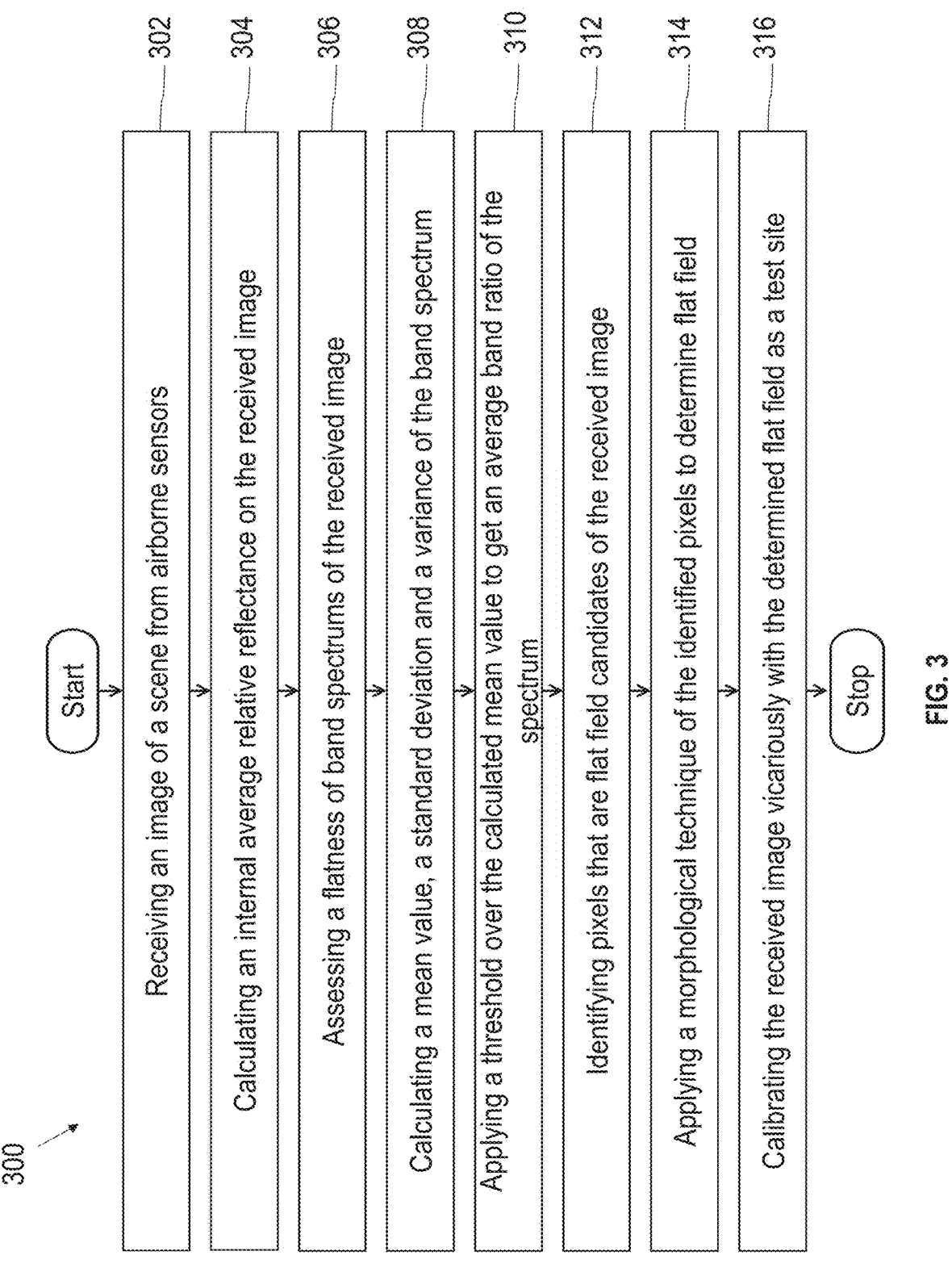

300

Start

302 — Receiving an image of a scene from airborne sensors

304 — Calculating an internal average relative reflectance on the received image 306 — Assessing a flatness of band spectrums of the received image 308 — Calculating a mean value, a standard deviation and a variance of the band spectrum 310 — Applying a threshold over the calculated mean value to get an average band ratio of the spectrum 312 — Identifying pixels that are flat field candidates of the received image 314 — Applying a morphological technique of the identified pixels to determine flat field 316 — Calibrating the received image vicariously with the determined flat field as a test site Stop

FIG. 3

SYSTEM AND METHOD FOR VICARIOUS CALIBRATION OF OPTICAL DATA FROM SATELLITE SENSORS

CROSS-REFERENCE TO RELATED APPLICATIONS AND PRIORITY

This U.S. patent application claims priority under 35 U.S.C. § 119 to Indian Application number 202221051326, filed on Sep. 8, 2022. The entire contents of the aforementioned application are incorporated herein by reference.

TECHNICAL FIELD

The disclosure herein generally relates to the field of vicarious calibration and more specifically, to a method and system for vicarious calibration of optical data from satellite sensors.

BACKGROUND

Several factors affect remotely sensed data, such as different illumination conditions, atmospheric effects, observation geometries, as well as sensor properties. Geometric and optical calibration process is done on the remotely sensed data, for data to be used for further analysis. Geometric calibration includes the calibration of location of the coordinate of the pixels for directly mapping and change detection of a particular location. While optical calibration is done to remove any atmospheric and optical effects introduce during remote sensing process. Accurate radiometric calibration is a critical step in remote sensing image processing, to use the available high quality images for different applications.

Vicarious calibration is a type of on-board calibration methodology in which ground-level measurement of the test sites is done and then those measurement is compared with the top of atmosphere sensor radiance to calibrate the sensor. These test sites can be artificial or man-made and can be available at most of the places on the earth to calibrate the sensor. Most of the products provided by the satellites and satellite sensors provide radiance as digital numbers (DN), this top of atmosphere radiance has to be calibrated to get the reflectance. These reflectance signatures of the materials in the images are compared with the library signature with any similarity measure to differentiate various materials in the image. On-board calibration is one way of calibrating sensors. Image calibration is another methodology that uses image information only, is simple, and uses most of the information from the scene only. An Internal Average Relative Reflectance (IAR) and flatfield are the two such image calibration techniques. The IAR uses the average spectrum of the whole image, while flatfield uses the average spectrum of the flat-field area in the image. The IAR uses the average of the whole image, so if the image is full of vegetation or any other dominant feature, then the IAR technique is not found to be suitable. In these scenarios, the flat-field technique is useful, but the main challenge comes with identifying the flat field in the scene.

In vicarious calibration, bright surfaces are preferred as the test sites for calibrations because it's reduces signal to noise ratio (SNR), the natural test site can be salt flats, dam faces, sand beaches, playa, etc., which are also flat-field contenders. Finding sufficient pixels for these regions as a test site in an urban scene is very rare. We might find salt flats and sand beaches in the coastal cities but not in other cities. Dam faces may be found in cities where the water supply reservoirs are on the outskirts of the city limits. But stone pitching merges with earthen embankments and the vegetation layer formed over time, due to which a bright signature is lost in time. Therefore, for the urban scene flat fields with the parking lots, playgrounds (soil not a grass), building construction sites, building roof covers (metallic and concrete), and open soil areas free from vegetation in undeveloped urban areas are considered.

SUMMARY

Embodiments of the disclosure present technological improvements as solutions to one or more of the above-mentioned technical problems recognized by the inventors in conventional systems. For example, in one embodiment, a method and system for vicarious calibration of optical data from satellite sensors is provided.

In one aspect, a processor-implemented method for vicarious calibration of optical data from satellite sensors is provided. The processor-implemented method comprising receiving via an input/output interface receiving an image of a scene from at least one satellite sensor, calculating an internal average relative reflectance (LAR) on the received image to get a relative reflectance image, assessing a flatness of a spectrum of one or more pixels of the image by taking band ratios for each of the one or more pixels and the ratio with each successive bands, calculating a mean value, a standard deviation, and a variance of the pixels of the band ratios to identify one or more pixels having band ratio, applying a threshold over the calculated mean value to get an average band ratio near to one and a threshold over the calculated variance to get an band ratio variance near to zero of the band ratios of the spectrum, identifying one or more pixels that are flat field candidates of a binary image, wherein the one or more pixels having the average band ratio nearing one, applying a predefined morphological technique on the identified one or more pixels as flat filed candidates to determine a flat field, and calibrating the received image vicariously with the determined flat field as a test site.

In another aspect, a system for vicarious calibration of optical data from satellite sensors is provided. The system includes an input/output interface configured to receive an image of a scene from at least one satellite sensor one or more hardware processors and at least one memory storing a plurality of instructions, wherein the one or more hardware processors are configured to execute the plurality of instructions stored in the at least one memory.

Further, the system is configured to calculate an internal average relative reflectance (IAR) on the received image to get a relative reflectance image, assess a flatness of a spectrum of one or more pixels of the image by taking band ratios for each of the one or more pixels and the ratio with each successive bands, calculate a mean value, a standard deviation, and a variance of the pixels of the band ratios to identify one or more pixels having band ratio, apply a threshold over the calculated mean value to get an average band ratio near to one and a threshold over the calculated variance to get an band ratio variance near to zero of the band ratios of the spectrum, identify one or more pixels that are flat field candidates of a binary image, wherein the one or more pixels having the average band ratio nearing one, apply a predefined morphological technique on the identified one or more pixels as flat filed candidates to determine a flat field, and calibrate the received image vicariously with the determined flat field as a test site.

In yet another aspect, one or more non-transitory machine-readable information storage mediums are provided comprising one or more instructions, which when executed by one or more hardware processors causes a method for vicarious calibration of optical data from satellite sensors. The processor-implemented method comprising receiving via an input/output interface receiving an image of a scene from at least one satellite sensor, calculating an internal average relative reflectance (IAR) on the received image to get a relative reflectance image, assessing a flatness of a spectrum of one or more pixels of the image by taking band ratios for each of the one or more pixels and the ratio with each successive bands, calculating a mean value, a standard deviation, and a variance of the pixels of the band ratios to identify one or more pixels having band ratio, applying a threshold over the calculated mean value to get an average band ratio near to one and a threshold over the calculated variance to get an band ratio variance near to zero of the band ratios of the spectrum, identifying one or more pixels that are flat field candidates of a binary image, wherein the one or more pixels having the average band ratio nearing one, applying a predefined morphological technique on the identified one or more pixels as flat filed candidates to determine a flat field, and calibrating the received image vicariously with the determined flat field as a test site.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram to illustrate a method for vicarious calibration of optical data from satellite sensors, in accordance with some embodiments of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for vicarious calibration of optical data from satellite sensors. It should be appreciated that vicarious calibration helps to calibrate the satellite sensors post-launch, with the use of natural or artificial sites on the Earth. In the same way, the scene with the flat-field sites is also calibrated to get the relative reflectance image product of the scene. Identifying test sites like building roofs, construction sites, parking lots, etc. in an urban scene automatically will help or-board calibration of the hyperspectral/multispectral image. This way of onboard remote sensing image calibration may lead to a faster way to get the reflectance image of the scene, with the help of the calibration constants.

In this onboard calibration methodology of vicarious calibration, flat fields are taken as a test site. There has been one previous attempt for automatic flat field detection in an image. In one prior art, the spectrum of pixels in the visible region is compared with multiple of the average spectrum from the image. But this approach has drawbacks of IAR. The materials which are flat field candidates may possess high brightness and flat spectrum compared to other materials in the image. The vegetation spectrum shows high reflectance in the infrared region and has many fluctuations in the spectrum, while water has negligible reflectance after the visible range. But concrete materials and soils have a flat spectrum throughout the spectrum.

It is to be noted that the automatic flat-field detection technique comprises several steps to get the relative reflectance image of the scene. In the first step, radiance to relative reflectance is converted with IAR and apply it to the image to get the relative reflectance of the image. Further, one or more flat field characteristics is applied to this reflectance spectrum to get the reflectance image of the scene.

Figure 1:
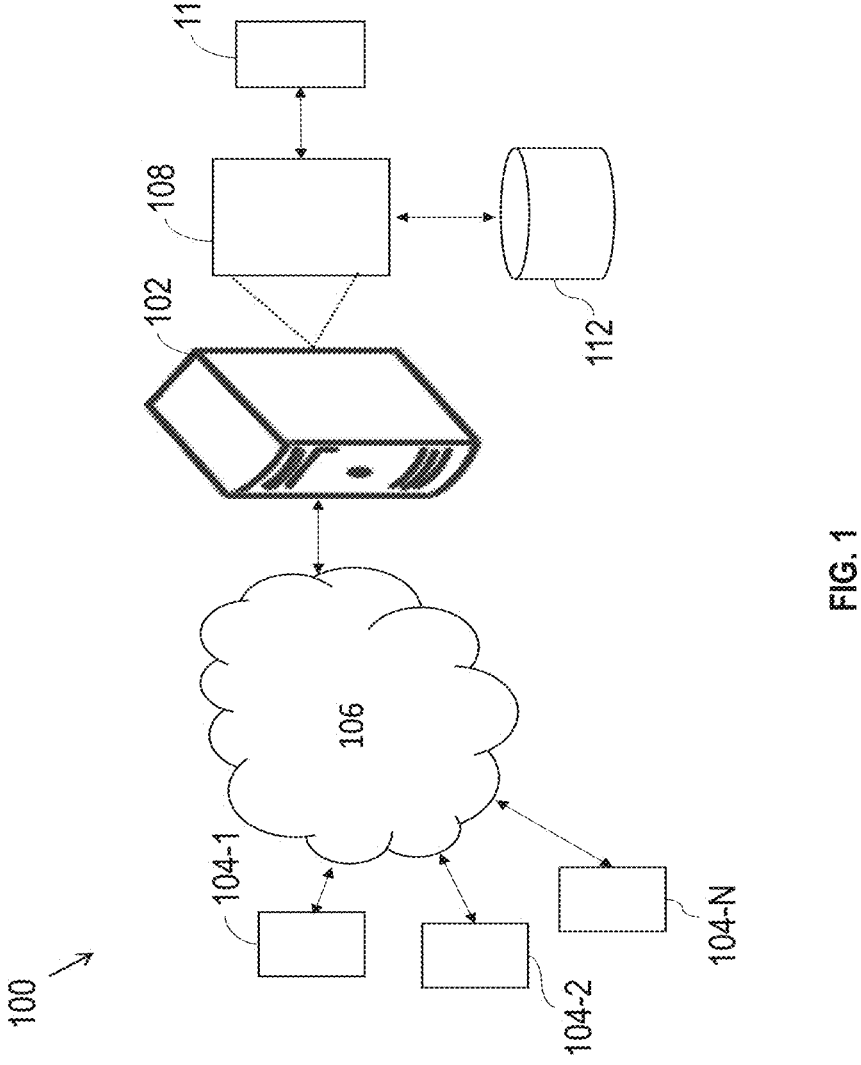
FIG. 1 illustrates a block diagram of an exemplary system for vicarious calibration of optical data from satellite sensors, in accordance with some embodiments of the present disclosure.
Figure 2:
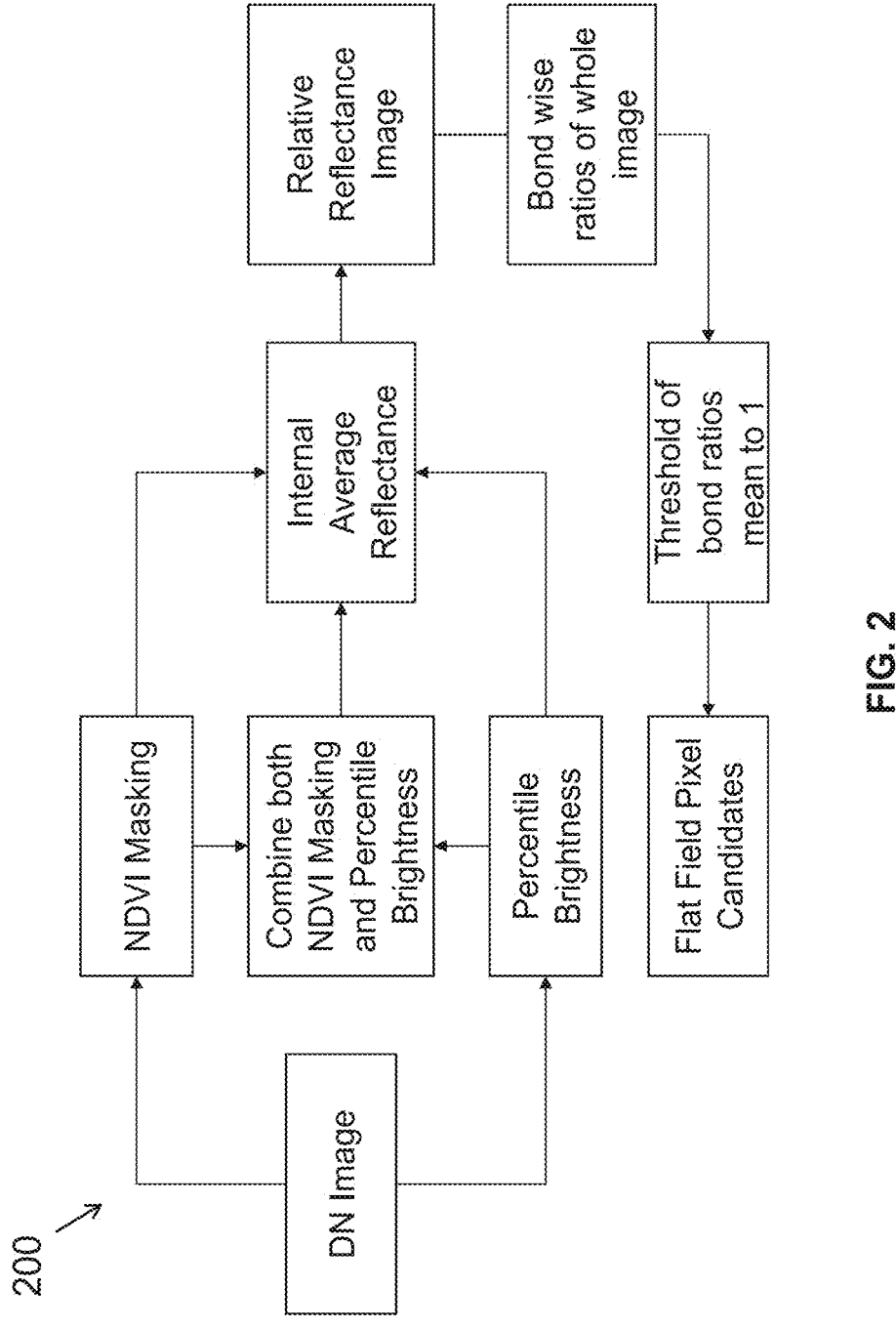
FIG. 2 is a flowchart to illustrate the system for vicarious calibration of optical data from satellite sensors, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a block diagram of a system (100) for vicarious calibration of optical data from satellite sensors, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory (110) to execute a plurality of instructions therein. The components and functionalities of the system (100) are described further in detail.

Herein, the one or more I/O interfaces (104) are configured to receive an image of a scene from at least one satellite sensor. Herein, the received image is in any form of image or data cube provided by the satellite sensor. The received image of any location (scene) is sensed by the satellite sensors.

Referring FIG. 2, a flow diagram (200), illustrating the system (100) for vicarious calibration of optical data from satellite sensors, in accordance with some embodiments of the present disclosure. The system (100) is configured to convert radiance to relative reflectance with an internal average relative reflectance (IAR) and apply it to the received image to get the relative reflectance of the image. The IAR is a technique to get the relative reflectance of the image from image data itself. Further, one or more characteristics of the flat field are applied to the reflectance spectrum, and this is also applied to the received image to get the reflectance image of the scene.

In another embodiment, the system (100) is configured to calculate an internal average relative reflectance (IAR) on the received image to get a relative reflectance image. It would be appreciated that there are many ways to get the relative reflectance of the image. The IAR is a technique to get a relative reflectance of the image from DNs and radiance image. These DNs/radiance image is provided by the satellite has to be converted into the reflectance to use the satellite data in different applications. Herein, an average spectrum is calculated by averaging the image for each band to get the average spectrum of the image and then divide the whole image by the calculated average spectrum.

$$IAR = \frac{P_{ij}}{\left( \frac{1}{axb} \sum_{i=1}^{i=a} \sum_{j=1}^{i=b} P_{ij} \right)} \qquad (1)$$

wherein, $P_{ij}$ is the pixel at $i^{th}$ row and $j^{th}$ column and axle is the number of pixels for the brightest pixels.

Further, the system (100) is configured to assess a flatness of a spectrum of one or more pixels of the image by taking band ratios for each of the one or more pixels and the ratio with each successive bands. The spectrum of the vegetation shows a high reflectance in an infrared region and a plurality of fluctuations in the band spectrum.

Herein, the system (100) may go through each pixel one by one and take the band ratio, if there is (R, C, B) size of the image, where R is the number of rows, C is the number of columns and B is the number of bands. The system (100) may take band ratios by $B_{i+1}/B_i$ where i belongs to [1, B]. To get the band ratios of the image with the shape of (R, C, B−1).

It is to be noted that in a normal image there are three (i.e., RGB) band spectrum but in a multispectral images there are 4-15 band spectrums and in the hyperspectral images there are more than 50 band spectrum. When values of these band spectrum are same, it makes a flat spectrum. For example, if there are an RGB image and its value for pixel is 150, 150, & 150 for RGB band spectrums, then if the RGB band spectrum is plotted with RGB wavelength as an x-axis then it has a flat spectrum for that pixel.

In hyperspectral/multispectral image wavelength is divided into bands. The hyperspectral image has much narrower bands (due to large number of bands/channels) and the multispectral image has wider bands (due to small number of bands/channels). Band ratio is just the division of the pixel values for the consecutive bands for the multispectral/hyperspectral images. For example, in the RGB image band ratio will be value of green band spectrum divided by the red spectrum.

In another embodiment, the system (100) is configured to calculate a mean value, a standard deviation, and a variance of the pixel band ratios to identify one or more pixels having band ratio. Herein, having band ratios mean near to 1 and the variance near to 0. Band ratio for consecutive bands is calculated. If there are N number of bands then there will be N−1 band ratios.

Further, the system (100) is configured to apply a threshold over the calculated mean value to get an average band ratio near to one and a threshold over the calculated variance to get a variance of band ratio near to zero of the band ratios of the spectrum.

In yet another embodiment, the system (100) is configured to identify one or more pixels that are flat field candidates of a binary image. The one or more pixels having the average band ratio nearing one. Further, the system (100) is configured to apply a predefined morphological technique on the identified one or more pixels as flat filed candidates to determine a flat field. Furthermore, the system (100) is configured to calibrate the received image vicariously with the determined flat field as a test site. The onboard remote sensing image calibration may lead to a faster way to get the reflectance image of the scene with the help of the calibration constants.

Referring FIG. 3, to illustrate a processor-implemented method (300) for generating a hyperspectral artificial vision for machines. Initially, at step (302), receiving, via an input/output interface, an image of a scene from at least one satellite sensor.

At the next step (304), calculating an internal average relative reflectance (IAR) on the received image to get a relative reflectance image. It would be appreciated that there are many ways to get the relative reflectance of the image. The IAR is a technique to get a relative reflectance of the image from DNs and radiance image.

At the next step (306), assessing a flatness of a spectrum of one or more pixels of the image by taking band ratios for each of the one or more pixels and the ratio with each successive bands. The spectrum of the vegetation shows a high reflectance in an infrared region and a plurality of fluctuations in the band spectrum.

It would be appreciated that the band ratio for each of the one or more pixels is determined, if there is (R, C, B) size of the image, where R is the number of rows, C is the number of columns and B is the number of bands. The system (100) may take band ratios by $B_{i+1}/B_i$ where i belongs to [1, B]. To get the band ratios of the image with the shape of (R, C, B−1).

At the next step (308), calculating a mean value, a standard deviation, and a variance of the pixel band ratios to identify one or more pixels having band ratio At the next step (310), applying a threshold over the calculated mean value to get an average band ratio near to one and a threshold over the calculated variance to get a variance of band ratio near to zero of the band ratios of the spectrum.

At the next step (312), identifying one or ore pixels that are flat field candidates of a binary image, wherein the one or more pixels having the average band ratio nearing one.

At the next step (314), applying a predefined morpho-logical technique on the identified one or more pixels as flat filed candidates to determine a flat field.

At the last step (316), calibrating the received image vicariously with the determined flat field as a test site. Vicarious calibration is a type of on-board calibration meth-odology in which ground-level measurement of the test site is done and then the ground-level measurement is compared with the top of atmosphere sensor radiance to calibrate the sensor.

The written description describes the subject matter herein to enable any person skilled in the art to make and use the embodiments. The scope of the subject matter embodi-ments is defined by the claims and may include other modifications that occur to those skilled in the art. Such other modifications are intended to be within the scope of the claims if they have similar elements that do not differ from the literal language of the claims or if they include equiva-lent elements with insubstantial differences from the literal language of the claims.

The embodiments of present disclosure herein address the problem of vicarious calibration, which is a type of on-board calibration methodology in which ground-level measure-ment of the test site is done and then those measurement is compared with the top of atmosphere sensor radiance to calibrate the sensor. Embodiments herein provide a method and system for a vicarious calibration of optical data from satellite sensors for the urban scene flat fields. The material which is flat field candidate will possess high brightness and flat spectrum compared to other materials in the image of the scene. The on-board calibration of the remote sensing image may lead to a faster way to get the reflectance image of the scene, with the help of the calibration constants.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be imple-mented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by vari-ous modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongo-ing technological development will change the manner in which particular functions are performed. These examples are presented herein for purposes of illustration, and not limitation. Further, the boundaries of the functional building blocks have been arbitrarily defined herein for the conve-nience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodi-ments. Also, the words "comprising," "having," "contain-ing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments con-sistent with the present disclosure. A computer-readable storage medium refers to any type of physical memory on which information or data readable by a processor may be stored. Thus, a computer-readable storage medium may store instructions for execution by one or more processors, including instructions for causing the processor(s) to per-form steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be con-sidered as exemplary only, with a true scope of disclosed embodiments being indicated by the following claims

What is claimed is:

1. A processor-implemented method comprising:

receiving, via an input/output interface, an image of a scene from at least one satellite sensor;

calculating, via one or more hardware processors, an internal average relative reflectance (IAR) on the received image to get a relative reflectance of the received image;

determining, via the one or more hardware processors, band ratios for each of the one or more pixels of the received image with each successive band to assess flatness of a spectrum of the one or more pixels;

calculating, via the one or more hardware processors, a mean value, a standard deviation, and a variance of the one or more pixels;

applying, via the one or more hardware processors,
  a threshold over the calculated mean value to get an average band ratio near to one, and
  a threshold over the calculated variance to get a band ratio variance near to zero of the one or more pixels;

identifying, via the one or more hardware processors, at least one flat field candidate from the one or more pixels of the received image having the average band ratio nearing one;

determining, via the one or more hardware processors, a flat field from the identified at least one flat field candidate by applying a predefined morphological technique; and calibrating, via the one or more hardware processors, the received image vicariously based on the determined flat field as a test site.

2. The processor-implemented method of claim 1, wherein the IAR calculation includes:
  masking a predefined portion of the image with a Normalized Difference Vegetation Index (NDVI) thresholding to remove the effect of vegetation; and
  calculating a relative reflectance of the one or more pixels from the remaining unmasked portion of the image.

3. The processor-implemented method of claim 1, wherein the mean value, the standard deviation, and the variance of the one or more pixels are calculated to assess spectrum flatness of each of the one or more pixels.

4. The processor-implemented method of claim 1, wherein the identified at least one flat field candidate comprising a predefined large soil area, and a predefined large industrial and a predefined large residential roof.

5. The processor-implemented method of claim 1, wherein the predefined morphological technique is used to identify a large flat field candidate which comprises of the one or more pixels.

6. A system comprising:
  an input/output interface to receive an image of a scene from at least one satellite sensor;
  a memory in communication with the one or more hardware processors, wherein the one or more hardware processors are configured to execute programmed instructions stored in the memory to:
    calculate an internal average relative reflectance (IAR) on the received image to get a relative reflectance of the received image;
    determine band ratios for each of the one or more pixels of the received image with each successive band to assess flatness of a spectrum of the one or more pixels;
    calculate a mean value, a standard deviation, and a variance of the one or more pixels;
    apply a threshold over the calculated mean value to get an average band ratio near to one and a threshold over the calculated variance to get a band ratio variance near to zero of the one or more pixels;
    identify at least one flat field candidate from the one or more pixels of the received image having the average band ratio nearing one;
    determine a flat field from the identified at least one flat field candidate by applying a predefined morphological technique; and
    calibrate the received image vicariously with the determined flat field as a test site.

7. The system of claim 6, wherein the IAR calculation includes:
  masking a predefined portion of the image with a Normalized Difference Vegetation Index (NDVI) thresholding to remove the effect of vegetation; and
  calculating a relative reflectance of pixels from the remaining unmasked portion of the image.

8. The system of claim 6, wherein the mean value, the standard deviation, and the variance of the one or more pixels are calculated to assess spectrum flatness of each of the one or more pixels.

9. The system of claim 6, wherein the identified at least one flat field candidate comprising a predefined large soil area, and a predefined large industrial and a predefined large residential roof.

10. The system of claim 6, wherein the predefined morphological technique is used to identify a large flat field candidate which comprises of the one or more pixels.

11. One or more non-transitory machine-readable information storage mediums comprising one or more instructions which when executed by one or more hardware processors cause:
  receiving, via an input/output interface, an image of a scene from at least one satellite sensor;
  calculating an internal average relative reflectance (IAR) on the received image to get a relative reflectance of the received image;
  determining band ratios for each of the one or more pixels of the received image with each successive band to assess flatness of a spectrum of the one or more pixels;
  calculating a mean value, a standard deviation, and a variance of the one or more pixels;
  applying:
    a threshold over the calculated mean value to get an average band ratio near to one, and
    a threshold over the calculated variance to get a band ratio variance near to zero of the one or more pixels;
  identifying at least one flat field candidate from the one or more pixels of the received image having the average band ratio nearing one;
  determining a flat field from the identified at least one flat field candidate by applying a predefined morphological technique; and
  calibrating the received image vicariously with the determined flat field as a test site.

12. The one or more non-transitory machine-readable information storage mediums of claim 11, wherein the IAR calculation includes:
  masking a predefined portion of the image with a Normalized Difference Vegetation Index (NDVI) thresholding to remove the effect of vegetation; and
  calculating a relative reflectance of the one or more pixels from the remaining unmasked portion of the image.

13. The one or more non-transitory machine-readable information storage mediums of claim 11, wherein the mean value, the standard deviation, and the variance of the one or more pixels are calculated to assess spectrum flatness of each of the one or more pixels.

14. The one or more non-transitory machine-readable information storage mediums of claim 11, wherein the identified at least one flat field candidate comprising a predefined large soil area, and a predefined large industrial and a predefined large residential roof.

15. The one or more non-transitory machine-readable information storage mediums of claim 11, wherein the predefined morphological technique is used to identify a large flat field candidate which comprises of the one or more pixels.

\* \* \* \* \*